United States Patent [19]
Phaal

[11] Patent Number: 4,520,881
[45] Date of Patent: Jun. 4, 1985

[54] TOOL COMPONENT

[76] Inventor: Cornelius Phaal, 34 Rutland Ave., Craighall Park, Johannesburg, Transvaal, South Africa

[21] Appl. No.: 534,195

[22] Filed: Sep. 21, 1983

[30] Foreign Application Priority Data

Sep. 24, 1982 [ZA] South Africa .................. 82/7030

[51] Int. Cl.³ ............................................. E21B 10/46
[52] U.S. Cl. ................... 175/329; 175/410; 175/411; 228/263.12
[58] Field of Search .............. 175/329, 330, 374, 375, 175/410, 411; 228/263.11, 263.12; 420/502, 587

[56] References Cited

U.S. PATENT DOCUMENTS

| | | | |
|---|---|---|---|
| 4,073,354 | 2/1978 | Rowley | 175/410 X |
| 4,221,270 | 9/1980 | Vezirian | 175/329 |
| 4,289,211 | 9/1981 | Lumen | 175/410 |
| 4,303,136 | 12/1981 | Ball | 175/410 X |

FOREIGN PATENT DOCUMENTS

| | | | |
|---|---|---|---|
| 410947 | 5/1934 | United Kingdom | 175/410 |
| 1532840 | 11/1978 | United Kingdom | 420/587 |

*Primary Examiner*—Stephen J. Novosad
*Assistant Examiner*—Michael Starinshy
*Attorney, Agent, or Firm*—Curtis, Morris & Safford

[57] ABSTRACT

A tool component comprising a composite compact located in a sloping recess in one end of a solid, elongate right-circular cylindrical pin and bonded thereto. The recess is characterized in that it is formed in the pin to one side of a longitudinal plane passing through the central axis of the pin and the base wall of the recess slopes from one end surface towards a side surface. Bonding of the composite compact to the pin is preferably achieved by means of a braze alloy having a working temperature of less than 700° C. and containing silver, copper, zinc, manganese and nickel. The tool component has particular application as a cutting component for a drill bit.

16 Claims, 4 Drawing Figures

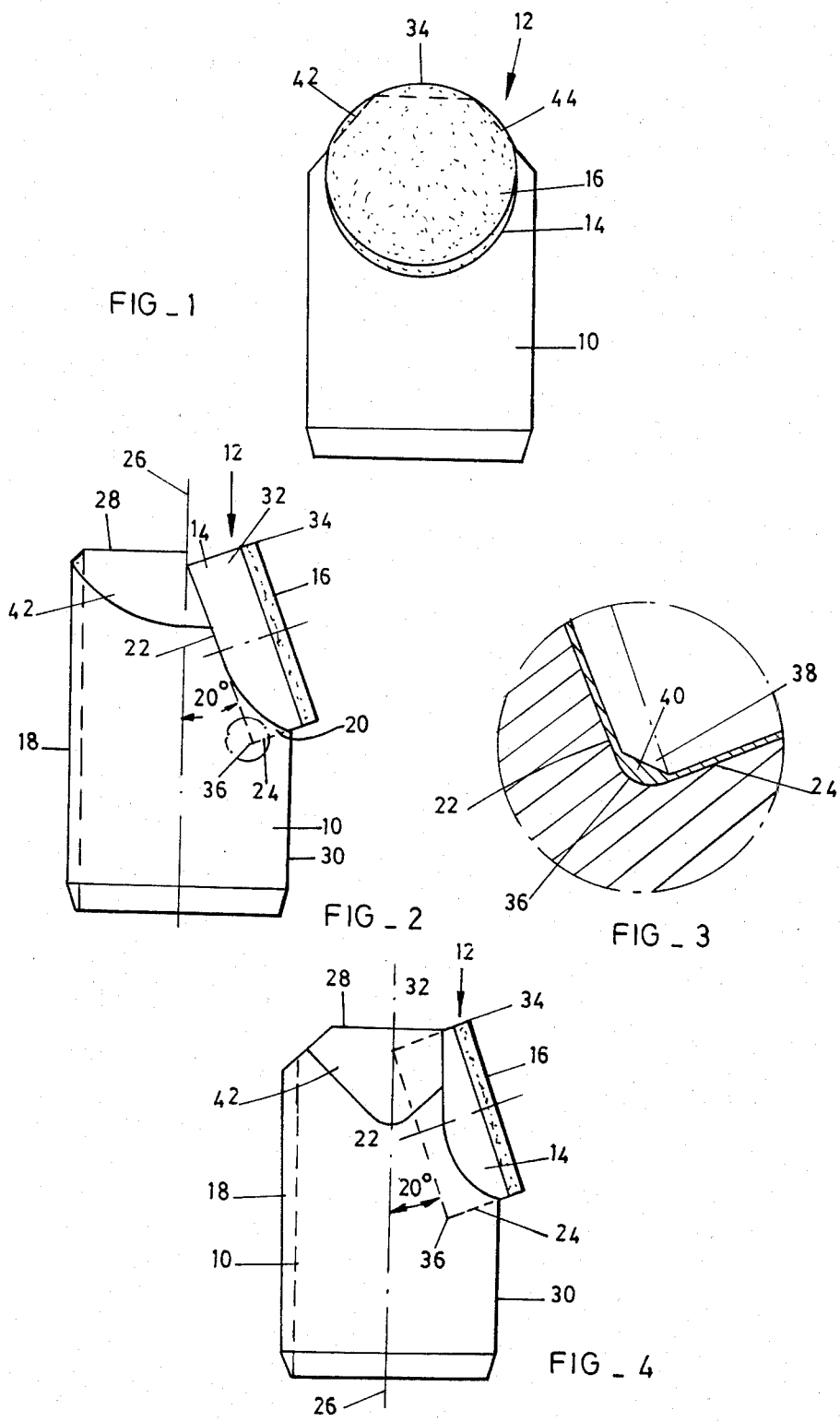

4,520,881

TOOL COMPONENT

BACKGROUND OF THE INVENTION

This invention relates to tool components and more particularly to cutting components for drill bits.

Abrasive compacts are well known in the art and are used for a variety of abrading operations such as cutting, drilling, grinding and the like. Abrasive compacts consist of a polycrystalline mass of bonded abrasive particles, the abrasive particle content of which is at least 70 percent by volume and generally 80 to 90 percent by volume. The abrasive particles may be self-bonded without the aid or use of a second or bonding phase. Alternatively, a second or bonding phase may be provided. The abrasive particles for compacts are invariably diamond or cubic boron nitride.

Abrasive compacts may be bonded to cemented carbide supports. Such bonded compacts are often referred to as composite compacts. Bonding between the compact and the carbide support may be direct but without the interposition of a braze layer. Alternatively, a bonding braze layer may be provided between the compact and the carbide support.

A more detailed description of abrasive compacts and composite compacts may be found in a number of published patent specifications, for example U.S. Pat. Nos. 3,743,489, 3,767,371, 4,063,909 and 3,745,623.

Rotary drills used for oil and gas well drilling and core drilling generally comprise a drill bit having formed thereon a plurality of preformed sockets in which cutting elements or components are mounted. The cutting elements or components may be brazed, force fitted or heat shrunk into the sockets. Typical cutting elements used in the prior art are steel teeth, steel teeth laminated with tungsten carbide, inserts of cemented tungsten carbide and natural diamonds.

Cutting components for drill bits and utilising composite compacts have also been described in the literature and have been used commercially. Such cutting elements comprise an elongate pin of cemented carbide to which is bonded a composite compact, bonding being achieved through the carbide support of the composite compact. Bonding between the carbide support and the elongate pin is achieved by a braze metal which has a melting point above 700° C. Such a high temperature braze, so the art teaches, is essential in order to achieve a sufficiently strong bond between the composite compact and the elongate pin. Reference in this regard may be had to the disclosures of U.S. Pat. No. 4,225,322.

It has also been proposed to produce a cutting component utilising composite compacts by forming a pocket or recess in an elongate pin to accommodate the composite compact. The composite compact is located in the pocket or recess and then brazed thereto using a braze such as Easy Flo 45 braze. Reference in this regard may be had to the article "Design, Fabrication and Field Test Performance of Slug-type Diamond Compacts Oil Bits" by W. H. Daniels and D. A. Thompson, Journal of Energy Resources Technology, March 1979, Vol. 101 pages 41 to 45. To the best of the Applicant's knowledge, such cutting components have never been used commercially. It is believed that one of the reasons why such cutting components have not been used commercially is that a stress concentration caused by the pocket apparently makes the carbide mounting pin a weaker link. Fracture of the pin through the pocket zone occurs.

SUMMARY OF THE INVENTION

According to the present invention there is provided a tool component comprising:
(a) a composite compact comprising an abrasive compact bonded to a cemented carbide support;
(b) a solid, elongate cylindrical pin having end surfaces joined by side surfaces;
(c) a recess formed in the pin and comprising a base wall and side walls; and
(d) the composite compact being located in the recess such that the carbide support is received by the recess and bonded to the walls thereof and the abrasive compact presents a cutting edge, characterised in that:
the recess is formed in the pin on one side of a longitudinal plane passing through the central axis of the pin and the base wall thereof slopes from one end surface towards a side surface.

DESCRIPTION OF THE DRAWINGS

FIG. 1 illustrates a front view of a tool component of the invention;

FIG. 2 illustrates a side view of the embodiment of FIG. 1;

FIG. 3 illustrates an enlarged sectional view of the ringed area of FIG. 2; and

FIG. 4 illustrates a side view of a second embodiment of the invention.

DETAILED DESCRIPTION OF THE INVENTION

As mentioned above, the tool component of the invention is characterised by the recess being formed to one side of a longitudinal plane passing through the central axis of the pin and the base wall slopes from the one end surface to a side surface. This location of the recess to one side of the pin has been found to be of importance because the composite compact is provided thereby with substantial carbide backing support and strength. The top end of the sloping base wall will typically start at the central axis of the pin.

Bonding of the carbide support to the elongate pin may be achieved by means of a suitable braze alloy. In particular, a braze alloy having a working temperature of less than 700° C. and containing silver, copper, zinc, manganese and nickel has been found to be particularly suitable. Braze alloys have a melting range and by "working temperature" is meant the temperature at which melting will take place under ambient conditions to allow a braze joint to be formed. The use of a braze alloy having a working temperature of less than 700° C. means that the risk of damage to the abrasive particles of the compact occurring during brazing is minimised. Moreover, it makes for simpler manufacturing conditions and apparatus. The preferred braze alloy contains 49 percent silver, 16 percent copper, 23 percent zinc, 7.5 percent manganese, 4.5 percent nickel, all percentages being by weight. Examples of such alloys are Degussa 4900 and Argo-braze 49.

The base wall of the recess will preferably slope at an angle of 17° to 25°, typically 20°, to the longitudinal plane.

The base walls and side walls of the recess meet at a corner or line. To provide maximum strength and to minimise fracture taking place in the pin during use, it has been found that the corner should have a radius and the edge of the carbide support which is received by this corner should have a larger radius than that of the corner or be chamfered. In both cases, direct point contact is avoided and space is provided between the compact and the pin to receive the braze alloy. This may explain why fracture problems are avoided.

The side walls of the recess may be circular when viewed in plan or form an arc.

The composite compact may be any known in the art and as described in any one of the United States patents described above. The compact for the composite compact will in general be a diamond compact. The most usual shape of the composite compact is a disc.

The solid, elongate cylindrical pin will generally be made of a cemented carbide such as cemented tungsten carbide.

The elongate pin will generally have a right-circular cylindrical shape.

As is known in the art, the surfaces of the pin immediately behind the composite compact may be cut away to provide sufficient clearance in use.

The tool component of the invention has particular application as a cutting element or component for a drill bit. The component may be secured in a preformed hole in a drill bit by brazing, force fitting or heat shrinking in the conventional manner.

A first embodiment of the invention is illustrated by FIGS. 1 to 3 of the accompanying drawings. Referring to FIGS. 1 and 2, there is shown a cutting component for a drill bit comprising an elongate pin 10 of right-circular cylindrical shape. To one side of the pin there is bonded a disc-shaped composite compact 12 comprising a cemented carbide support 14 and an abrasive compact 16. The opposite side of the pin has formed therein a longitudinal groove 18. The groove assists in the location of the pin in the drill bit and for the removal of gasses, when brazing is used.

The composite compact is located in a recess 20. The recess 20 has a base wall 22 and a side wall 24. The recess is formed in the pin to one side of longitudinal plane 26 which passes through the central axis of the pin.

The base wall 22 of the recess slopes from the end surface 28 towards side surface 30. This location of the recess, as mentioned above, is of importance in order to give the composite compact substantial rear support. The rear support is provided by the substantial volume of pin to the left hand side of longitudinal plane 26.

The composite compact is located in the recess such that the base of the carbide support 14 is supported by the base wall 22 and the side walls 32 of the carbide support are partially supported by the side walls 24 of the recess. The side walls 24, when viewed in plan, define an arc. In use, the top edge 34 provides the cutting edge.

The base wall 22 joins the side wall 24 of the recess along line or corner 36. This corner receives the lower edge of the carbide support, as can better be seen from FIG. 3. Referring to FIG. 3, it will be seen that the corner 36 has a radius whereas the lower edge 38 of the carbide support is chamfered. This arrangement produces a non-matching fit between the carbide edge 38 and the corner 36 and thereby avoids direct point contact. This, it has been found, is of importance in minimising fracture of the pin during use of the component. Moreover, braze alloy 40 can be accommodated between the two components in this region. By way of example, it has been found that for a composite compact of disc shape, as illustrated, and having a diameter of 13.44 mm and a depth of 5.0 mm, a radius of 0.3 mm and a chamfer having a vertical height of 0.5 mm and an angle of 45° provides a particularly strong and fracture-resistant tool component.

The top edges of the pin are cut away at 40 and 42.

The embodiment of FIG. 4 is similar to that of FIGS. 1 to 3 and like parts carry like numerals. The difference in this embodiment is that the side walls 24 of the recess surround the carbide support completely, and are therefore circular in plan.

I claim:

1. A tool component comprising:
   (a) a composite compact comprising an abrasive compact bonded to a cemented carbide support;
   (b) a solid, elongate cylindrical pin made of cemented carbide having end surfaces joined by side surfaces;
   (c) a recess formed in the pin and comprising a base wall and side walls; and
   (d) the composite compact being located in the recess such that the carbide support is received by the recess and bonded to the walls thereof and the abrasive compact presents a cutting edge, characterised in that:
   the recess is formed in the pin on one side of a longitudinal plane passing through the central axis of the pin and the base wall thereof slopes from one end surface towards a side surface;
   the bonding of the support to the walls of the recess is achieved by a braze alloy having a working temperature of less than 700° C. and containing silver, copper, zinc, manganese and nickel; and
   the base wall of the recess is joined to the side wall by a corner having a radius and a chamfered corner of the carbide support is received by the radiused corner of the recess.

2. A tool component according to claim 1 wherein the braze alloy contains 49 percent silver, 16 percent copper, 23 percent zinc, 7.5 percent manganese and 4.5 percent nickel, all percentages being by weight.

3. A tool component according to claim 1 wherein the base wall of the recess slopes at an angle of 17° to 25° to the longitudinal plane.

4. A tool component according to claim 4 wherein the angle is 20°.

5. A tool component according to claim 1 wherein the side walls completely surround the carbide support and are circular in plan.

6. A tool component according to claim 1 wherein the side walls partially surround the carbide support and are arc-shaped in plan.

7. A tool component according to claim 1 wherein the compact for the composite compact is a diamond compact.

8. A tool component according to claim 1 wherein the pin has a right circular cylindrical shape.

9. A tool component comprising:
   (a) a composite compact comprising an abrasive compact bonded to a cemented carbide support;
   (b) a solid, elongate cylindrical pin made of cemented carbide having end surfaces joined by side surfaces;
   (c) a recess formed in the pin and comprising a base wall and side walls; and
   (d) the composite compact being located in the recess such that the carbide support is received by the recess and bonded to the walls thereof and the abrasive compact presents a cutting edge, characterised in that:

the recess is formed in the pin on one side of a longitudinal plane passing through the central axis of the pin and the base wall thereof slopes from one end surface towards a side surface;

the bonding of the support to the walls of the recess is achieved by a braze alloy having a working temperature of less than 700° C. and containing silver, copper, zinc, manganese and nickel; and the base wall of the recess is joined to the side wall by a corner having a radius and a corner of the carbide support, having a radius larger than that of the corner, is received by this corner.

10. A tool component according to claim 9 wherein the braze alloy contains 49% silver, 16% copper, 23% zinc, 7.5% manganese and 4.5% nickel, all percentages being by weight.

11. A tool component according to claim 9 wherein the base wall of the recess slopes at an angle of 17° to 25° to the longitudinal plane.

12. A tool component according to claim 11 wherein the angle is 20°.

13. A tool component according to claim 9 wherein the side walls completely surround the carbide support and are circular in plan.

14. A tool component according to claim 9 wherein the side walls partially surround the carbide support and are arc-shaped in plan.

15. A tool component according to claim 9 wherein the compact for the composite compact is a diamond compact.

16. A tool component according to claim 9 wherein the pin has a right circular cylindrical shape.

* * * * *

UNITED STATES PATENT AND TRADEMARK OFFICE
CERTIFICATE OF CORRECTION

PATENT NO. : 4,520,881

DATED : June 4, 1985

INVENTOR(S) : Cornelius Phaal

It is certified that error appears in the above-identified patent and that said Letters Patent is hereby corrected as shown below:

Column 4, line 7, "40 and 42" should read --42 and 44--.

Column 4, line 45, "claim 4" should read -- claim 3 --.

Signed and Sealed this

Seventeenth Day of March, 1987

Attest:

DONALD J. QUIGG

Attesting Officer

Commissioner of Patents and Trademarks